United States Patent
Feng et al.

(10) Patent No.: US 11,945,975 B1
(45) Date of Patent: Apr. 2, 2024

(54) WATER-BASED ADHESIVE AND PREPARATION METHOD THEREOF, AND USE IN ANODE OF LITHIUM BATTERY

(71) Applicant: QIHE LEAHOU CHEMICAL CO., LTD., Dezhou (CN)

(72) Inventors: Lianxiang Feng, Dezhou (CN); Feng Hai, Dezhou (CN); Mingtao Li, Dezhou (CN); Qinwei Zhou, Dezhou (CN); Shuguang Qu, Dezhou (CN); Shunping Wang, Dezhou (CN)

(73) Assignee: QIHE LEAHOU CHEMICAL CO., LTD., Dezhou (CN)

( * ) Notice: Subject to any disclaimer, the term of this patent is extended or adjusted under 35 U.S.C. 154(b) by 0 days.

(21) Appl. No.: 18/386,503

(22) Filed: Nov. 2, 2023

(30) Foreign Application Priority Data

Apr. 27, 2023 (CN) .......................... 202310464482.5

(51) Int. Cl.
*C09J 133/02* (2006.01)
*C09J 9/02* (2006.01)
*C09J 133/20* (2006.01)
*C09J 133/26* (2006.01)

(52) U.S. Cl.
CPC ............... *C09J 133/02* (2013.01); *C09J 9/02* (2013.01); *C09J 133/20* (2013.01); *C09J 133/26* (2013.01)

(58) Field of Classification Search
None
See application file for complete search history.

(56) References Cited

U.S. PATENT DOCUMENTS

| | | | |
|---|---|---|---|
| 2012/0183848 A1* | 7/2012 | Kang | H01M 4/0404 526/216 |
| 2021/0189037 A1* | 6/2021 | Pan | H01M 4/136 |
| 2023/0141592 A1* | 5/2023 | Jiang | H01M 4/139 252/506 |

FOREIGN PATENT DOCUMENTS

| | | |
|---|---|---|
| CN | 102770995 | 11/2012 |
| CN | 114479722 A * | 5/2022 |

OTHER PUBLICATIONS

CN 114479722 A, May 2022, machine translation (Year: 2022).*

* cited by examiner

*Primary Examiner* — Satya B Sastri
(74) *Attorney, Agent, or Firm* — Fish IP Law, LLP

(57) ABSTRACT

Provided are a water-based adhesive and a preparation method thereof, and its use in an anode of a lithium battery. The method for preparing a water-based adhesive includes mixing a surfactant, acrylic acid, acrylonitrile, acrylamide and water to obtain a mixture system; heating the mixture system to a polymerization temperature to obtain a heated mixture system; adding an initiator into the heated mixture system and subjecting a resulting system to polymerization to obtain a linear polymer; adding a cross-linking agent into the linear polymer and subjecting a resulting mixture to cross-linking reaction to obtain a cross-linking system; cooling the cross-linking system after the cross-linking reaction is completed to obtain a cooled cross-linking system; and adjusting a pH of the cooled cross-linking system to 6-7 to obtain the water-based adhesive.

6 Claims, 2 Drawing Sheets

WATER-BASED ADHESIVE AND PREPARATION METHOD THEREOF, AND USE IN ANODE OF LITHIUM BATTERY

CROSS REFERENCE TO RELATED APPLICATION

This application claims the benefit and priority of Chinese Patent Application No. 2023104644825, entitled "Water-based adhesive and preparation method thereof, and use in anode of lithium battery" filed with the China National Intellectual Property Administration on Apr. 27, 2023, the disclosure of which is incorporated by reference herein in its entirety as part of the present application.

TECHNICAL FIELD

The present disclosure relates to the technical field of adhesives, in particular to a water-based adhesive and a preparation method thereof, and its use in an anode of a lithium battery.

BACKGROUND

Lithium battery adhesives are used to bond and maintain electrode active materials, enhance electronic contact between the electrode active materials and conductive agents, as well as between the electrode active materials and current collectors, so as to better stabilize the structure of pole pieces. Since volumes of the cathode and anode of a lithium battery may expand or shrink during charging and discharging, the adhesive is required to play a certain buffering role in the expanding or shrinking. Lithium battery adhesives are mainly divided into two categories. One is oil-soluble adhesive, such as polyvinylidene difluoride (PVDF), which requires an organic solvent such as N-methylpyrrolidone as a dispersant, and is harmful to the environment; in addition, such adhesive shows poor adhesion to anode materials, and thus is mostly used in the cathode of lithium batteries. The other is water-based adhesive with water as a dispersant, which includes aqueous acrylic resin, carboxymethyl starch, sodium alginate, styrene-acrylic emulsion and the like. Among them, the aqueous acrylic resin contains a large number of carboxyl groups, and hydrogen bonds are hence formed between molecular chains of the aqueous acrylic resin, resulting in a certain degree of cross-linking; as a result, the aqueous acrylic resin has a better adhesive performance than other water-based adhesives. Further, it can form an ester bond and a hydrogen bond with hydroxyl groups on the surface of the active material particle or the conductive agent particle, thereby enhancing the adhesion force, which is conducive to the stability of the anode. Nevertheless, there are still many defects that limit applications of the aqueous acrylic resin, such as high brittleness and poor flexibility, resulting in that the adhesion force fails to meet the relatively high requirements, thus affecting the continuous cycle stability of lithium batteries.

SUMMARY

The present disclosure aims to provide a water-based adhesive, and a preparation method thereof and its use in an anode of a lithium battery. The water-based adhesive according to the present disclosure has an improved adhesive force of aqueous acrylic resin in the anode of the lithium battery, thereby endowing the lithium battery with a desirable cycle stability.

To achieve the above object, the present disclosure provides the following technical solutions.

The present disclosure provides a method for preparing a water-based adhesive, including the following steps:
mixing a surfactant, acrylic acid, acrylonitrile, acrylamide and water to obtain a mixture system; heating the mixture system to a polymerization temperature to obtain a heated mixture system; adding an initiator into the heated mixture system and subjecting a resulting system to polymerization to obtain a linear polymer;
adding a cross-linking agent into the linear polymer and subjecting a resulting mixture to cross-linking reaction to obtain a cross-linking system; cooling the cross-linking system after the cross-linking reaction is completed to obtain a cooled cross-linking system; and adjusting a pH of the cooled cross-linking system to 6-7 to obtain the water-based adhesive;
where in parts by mass, the surfactant is in an amount of 0 part to 5 parts, the acrylic acid is in an amount of 150 parts to 200 parts, the acrylonitrile is in an amount of 30 parts to 150 parts, and the acrylamide is in an amount of 5 parts to 200 parts.

In some embodiments, the initiator is in an amount of 1.1 parts to 2 parts based on parts by mass of the acrylic acid.

In some embodiments, the initiator is one or more selected from the group consisting of ammonium persulfate, sodium persulfate, potassium persulfate, hydrogen peroxide, tert-butyl hydroperoxide, benzoyl peroxide, and 2,2'-azobis[2-(2-imidazolin-2-yl)propane] dihydrochloride.

In some embodiments, the surfactant is selected from the group consisting of an anionic surfactant and a nonionic surfactant.

In some embodiments, the polymerization is conducted at a temperature of 60° C. to 90° C. for 2 h to 8 h.

In some embodiments, the cross-linking agent is in an amount of 0.05 parts to 5 parts based on parts by mass of the acrylic acid.

In some embodiments, the cross-linking agent is one or more selected from the group consisting of N,N-methylenebisacrylamide, N-methylolacrylamide, 2-(methacryloyloxy)ethyl acetoacetate, diethylenetriamine, triethylenetetramine, tetraethylenepentamine, polyethylene-polyamines, aziridine, and diisocyanate.

In some embodiments, the cross-linking reaction is conducted at a temperature of 80° C. to 90° C. for 0.5 h to 3 h.

The present disclosure further provides a water-based adhesive prepared by the method as described in the above solutions.

The present disclosure further provides use of the water-based adhesive as described in the above solutions in an anode of a lithium battery.

The present disclosure provides a method for preparing an water-based adhesive, including the following steps: mixing a surfactant, acrylic acid, acrylonitrile, acrylamide and water to obtain a mixture system; heating the mixture system to a polymerization temperature to obtain a heated mixture system; adding an initiator into the heated mixture system and subjecting a resulting system to polymerization to obtain a linear polymer; adding a cross-linking agent into the linear polymer and subjecting a resulting mixture to cross-linking reaction to obtain a cross-linking system; cooling the cross-linking system after the cross-linking reaction is completed to obtain a cooled cross-linking system; and adjusting a pH of the cooled cross-linking system to 6 to 7 to obtain the water-based adhesive; where in parts by mass, the surfactant is in an amount of 0 part to 5 parts, the acrylic acid is in an amount of 150 parts to 200 parts, the acrylonitrile is in an amount of 30 parts to 150 parts, and the acrylamide is in an amount of 5 parts to 200 parts.

In the present disclosure, a part of an acrylic acid monomer is replaced by acrylonitrile and acrylamide, resulting in enhancing the strength of the acrylic resin and improving the flexibility of the acrylic resin. In the present disclosure, the acrylic acid, acrylonitrile, and acrylamide act as monomers, and are synthesized into the linear polymer under the action of an initiator and then the linear polymer reacts with the cross-linking agent to form a network structure, thereby increasing molecular weight and viscosity of the aqueous acrylic resin. Compared with linear acrylic resin, the network structure shows better adhesive force, which reduces powder dropping and shedding of the anode material during use, thereby improving cycle stability and prolonging service life of the batteries.

DETAILED DESCRIPTION OF THE EMBODIMENTS

Figure 1:
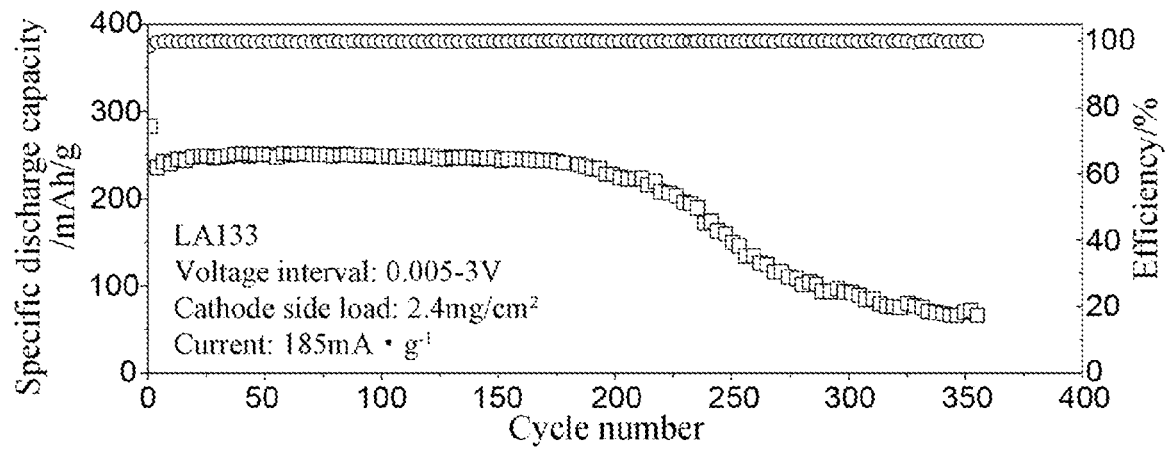
FIG. 1 shows a test result of a charge-discharge cycle stability of a button battery assembled with a commercially-available water-based adhesive.

The present disclosure provides a method for preparing a water-based adhesive, including the following steps:
mixing a surfactant, acrylic acid, acrylonitrile, acrylamide and water to obtain a mixture system; heating the mixture system to a polymerization temperature to obtain a heated mixture system; adding an initiator into the heated mixture system and subjecting a resulting system to polymerization to obtain a linear polymer;
adding a cross-linking agent into the linear polymer and subjecting a resulting mixture to cross-linking reaction to obtain a cross-linking system; cooling the cross-linking system after the cross-linking reaction is completed to obtain a cooled cross-linking system; and adjusting a pH of the cooled cross-linking system to 6-7 to obtain the water-based adhesive;
where in parts by mass, the surfactant is in an amount of 0 part to 5 parts, the acrylic acid is in an amount of 150 parts to 200 parts, the acrylonitrile is in an amount of 30 parts to 150 parts, and the acrylamide is in an amount of 5 parts to 200 parts.

In the present disclosure, unless otherwise specified, all raw materials used are commercially available products well-known to those skilled in the art.

In the present disclosure, a surfactant, acrylic acid, acrylonitrile, and acrylamide are mixed with water, and a resulting mixture system is heated to a polymerization temperature to obtain a heated mixture system. An initiator is then added thereto, and a resulting system is subjected to polymerization to obtain a linear polymer.

In some embodiments, the surfactant is an anionic surfactant or a nonionic surfactant. There is no special requirement on specific types of the anionic surfactant and the nonionic surfactant, and any anionic surfactant or nonionic surfactant well-known in the art may be used. In some embodiments, the anionic surfactant is sodium dodecyl sulfate (K12) and/or sodium dodecylbenzenesulfonate; the nonionic surfactant is fatty alcohol polyoxyethylene ether and/or fatty amine polyoxyethylene ether. The surfactant could improve a dispersibility of the linear polymer and improve a dispersibility of the monomer in an aqueous medium.

In some embodiments, water is distilled water, and serves as a reaction medium.

In some embodiments, in parts by mass, the surfactant is in an amount of 0 part to 5 parts, preferably 0 part or 1 part to 5 parts, more preferably 2 parts to 4 parts; the acrylic acid is in an amount of 150 parts to 200 parts, preferably 160 parts to 190 parts, more preferably 170 parts to 180 parts; the acrylonitrile is in an amount of 30 parts to 150 parts, preferably 50 parts to 130 parts, more preferably 70 parts to 100 parts; the acrylamide is in an amount of 5 parts to 200 parts, preferably 40 parts to 180 parts, more preferably 50 parts to 120 parts; and water is in an amount of 600 parts to 1,000 parts.

In some embodiments, the acrylamide is used in the form of an acrylamide aqueous solution; and a mass concentration of the acrylamide aqueous solution is in a range of 25% to 35%.

In the present disclosure, there is no special requirement for a process of mixing the surfactant, acrylic acid, acrylonitrile, acrylamide and water, as long as they could be mixed to be uniform. In some embodiments, water is added into a reactor, and then the surfactant, acrylic acid, acrylonitrile, and acrylamide are added thereto, and stirring is started.

In some embodiments, the initiator is one or more selected from the group consisting of ammonium persulfate, sodium persulfate, potassium persulfate, hydrogen peroxide, tert-butyl hydroperoxide, benzoyl peroxide, and 2,2'-azobis[2-(2-imidazolin-2-yl)propane] dihydrochloride. When the initiator includes multiple kinds of the above-mentioned substances, there is no special requirement on a ratio of each initiator. In some embodiments, the initiator is in an amount of 1.1 part to 2 parts based on parts by mass of the acrylic acid. The initiator is used in the form of an aqueous initiator solution; there is no special requirement on a concentration of the aqueous initiator solution, as long as the initiator could be completely dissolved.

In some embodiments, the polymerization is conducted at a temperature of 60° C. to 90° C., preferably 65° C. to 80° C., and more preferably 70° C.; and the polymerization is conducted for 2 h to 8 h, preferably 4 h to 6 h.

In some embodiments, the initiator is added at one time or added in two batches. When adding in two batches, the initiator is added for the first batch in an amount of 67% to 94% of a total mass of the initiator after the mixture system is heated to the polymerization temperature, and added for the second batch after the polymerization is completed. In the present disclosure, the initiator is added in batches to consume residual monomers and promote a conversion rate of the monomers, so as to avoid that some monomers do not participate in the polymerization after the initiator is consumed.

In the present disclosure, after a liner polymer is obtained, a cross-linking agent is added to the linear polymer and a resulting mixture is subjected to cross-linking reaction, a resulting cross-linking system is cooled after the cross-linking reaction is completed to obtain a cooled cross-linking system, and a pH of the cooled cross-linking system is adjusted to 6 to 7 to obtain the water-based adhesive.

In some embodiments, the cross-linking agent is one or more selected from the group consisting of N,N-methylenebisacrylamide, N-methylolacrylamide, 2-(methacryloyloxy)ethyl acetoacetate, diethylenetriamine, triethylenetramine, tetraethylenepentamine, polyethylene-polyamines, aziridine, and diisocyanate. When the cross-linking agent includes multiple kinds of the above-mentioned substances, there is no special requirement on a ratio of each cross-linking agent, and any ratio could be used. In some embodiments, based on parts by mass of the acrylic acid, the cross-linking agent is in an amount of 0.05 parts to 5 parts, preferably 0.1 parts to 4.5 parts, more preferably 1 part to 4 parts, and most preferably 2 to 3 parts.

In some embodiments, the cross-linking reaction is conducted at a temperature of 80° C. to 90° C., preferably 80° C.; and the cross-linking reaction is conducted for 0.5 h to 3 h, preferably 1 h to 2 h. During the cross-linking reaction, chain segments of the polymer are crosslinked to form a network structure.

In some embodiments, after the cross-linking reaction is completed, the cross-linking system is cooled to 40° C. to 50° C., and then adjusted to a pH of 6 to 7. In some embodiments, the pH of the system is adjusted by using an alkali solution; and the alkali solution is a sodium hydroxide solution, and a mass concentration of the sodium hydroxide solution is 30%.

In some embodiments, after the pH is adjusted, the synthesized polymer has high viscosity and is thus inconvenient to use; distilled water is added to the system after adjusting the pH so as to adjust content and viscosity of the polymer.

In some embodiment, the water-based adhesive has a viscosity of 5,000 mPa·s to 30,000 mPa·s and a polymer mass content of 5% to 15%.

The present disclosure further provides a water-based adhesive prepared by the method as described in the above solutions. In the present disclosure, a part of an acrylic acid monomer is replaced by acrylonitrile and acrylamide, resulting in enhancing the strength of the acrylic resin and improving the flexibility of the acrylic resin. In the present disclosure, the acrylic acid, acrylonitrile, and acrylamide serve as monomers, and are synthesized into the linear polymer under the action of an initiator, and then the linear polymer reacts with the cross-linking agent to form a network structure, thereby increasing molecular weight and viscosity of the aqueous acrylic resin. Compared with linear acrylic resin, the network structure shows better adhesive force, thereby improving an adhesive force in the anode of the lithium battery.

The present disclosure further provides use of the water-based adhesive as described in the above solutions in an anode of a lithium battery. There is no particular requirement on ways of the use, and ways of the use well-known in the art may be used.

The water-based adhesive, and the preparation method thereof, as well as its use in an anode of a lithium battery according to the present disclosure will be described in detail below with reference to examples, but these examples should not be construed as limiting the scope of the present disclosure.

Example 1

800 parts of distilled water, 3 parts of an anionic surfactant K12, 180 parts of acrylic acid, 40 parts of acrylonitrile, and 20 parts of acrylamide (dissolved with 50 parts of water) were added into a reactor, and stirred. A resulting mixture system was heated to 70° C., and 1.3 parts of ammonium persulfate (dissolved with 35 parts of water) were then added thereto. After that, a resulting system was subjected to polymerization for 4 h, and 0.3 parts of ammonium persulfate (dissolved with 10 parts of water) and 0.1 parts of N,N-methylenebisacrylamide were then added thereto. A resulting mixture was further heated to 80° C. and subjected to cross-linking reaction for 1 h to obtain a cross-linking system. The cross-linking system was cooled to 45° C., and a pH of the cooled cross-linking system was then adjusted to 6.48 by adding dropwise 260 parts of a sodium hydroxide solution with a mass concentration of 30%. Finally, A resulting product was adjusted to a polymer mass content of 15% by adding 1,400 parts of distilled water, obtaining a water-based adhesive with a viscosity of 27,200 mPa·s.

Example 2

1,000 parts of distilled water, 200 parts of acrylic acid, 40 parts of acrylonitrile, and 100 parts of acrylamide (dissolved with 340 parts of water) were added into a reactor, and stirred. A resulting mixture system was heated to 70° C., and 1 part of ammonium persulfate (dissolved with 35 parts of water) was then added thereto. After that, a resulting system was subjected to polymerization for 4 h, and 0.5 parts of ammonium persulfate (dissolved with 10 parts of water) and 2 parts of aziridine were added thereto. A resulting mixture was further heated to 80° C. and subjected to cross-linking reaction for 1 h to obtain a cross-linking system. The cross-linking system was cooled to 45° C., and a pH of the cooled cross-linking system was then adjusted to 6.61 by adding dropwise 270 parts of a sodium hydroxide solution with a mass concentration of 30%. Finally, a resulting product was adjusted to a polymer mass content of 15% by adding 1,540 parts of distilled water, obtaining a water-based adhesive with a viscosity of 51,600 mPa·s.

Comparative Example 1

This example was performed similar to Example 2, except that no cross-linking agent of aziridine was added. Specifically, this comparative example was performed as follows. 1,000 parts of distilled water, 200 parts of acrylic acid, 40 parts of acrylonitrile, and 100 parts of acrylamide (dissolved with 340 parts of water) were added into a reactor, and stirred. A resulting mixture system was heated to 70° C., and 1 part of ammonium persulfate (dissolved with 35 parts of water) was then added thereto. After that, a resulting system was subjected to polymerization for 4 h, and 0.5 parts of ammonium persulfate (dissolved with 10 parts of water) was added thereto. A resulting mixture was further heated to 80° C. and subjected to cross-linking reaction for 1 h to obtain a cross-linking system. The cross-linking system was cooled to 45° C., and a pH of the cooled cross-linking system was then adjusted to 6.63 by adding dropwise 270 parts of a sodium hydroxide solution with a mass concentration of 30%. Finally, a resulting product was adjusted to a polymer mass content of 15% by adding 1,540 parts of distilled water, obtaining a water-based adhesive with a viscosity of 13,500 mPa·s.

Performance Test:

An active material graphite, a conductive agent Super P, and a water-based adhesive were mixed at a mass ratio of 8:1:1, dispersed in deionized water, and stirred to form a stable and uniform anode slurry. The anode slurry was scraped on a copper foil with a thickness of 10 μm, dried at 50° C. and further vacuum-dried at 50° C. for 12 h, and then sliced to obtain an electrode sheet, where an active material loaded on the electrode sheet was in an amount of (2-4) mg/cm 2. Under the protection of an inert atmosphere, a cathode shell, the electrode sheet, a first electrolyte, a separator, a second electrolyte, a lithium sheet, a gasket, a battery shrapnel, and an anode shell were sequentially assembled to form a preformed battery and then pressed at 800 kPa for 5 s to obtain a button battery for testing a cycle stability of charging and discharging. The water-based adhesive was separately from Example 1, Example 2, Comparative Example 1, and a commercially-available water-based adhesive (LA133 from Sichuan Indigo Technology Co., Ltd., China). The test results are shown in FIG. 1 to FIG. 4.

Figure 2:
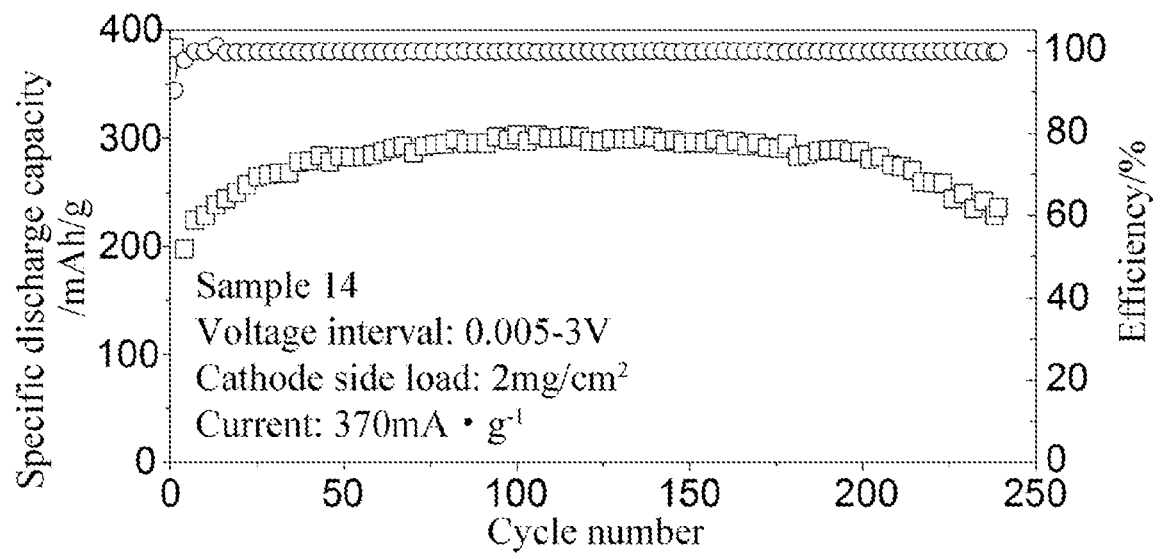
FIG. 2 shows a test result of a charge-discharge cycle stability of a button battery assembled with the water-based adhesive prepared in Example 1.
Figure 3:
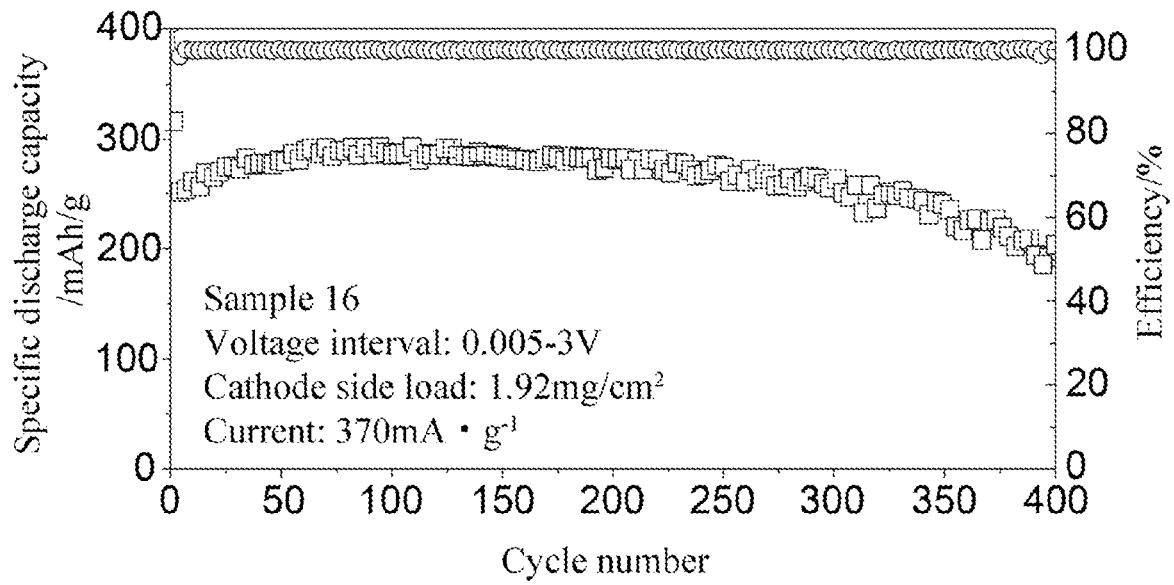
FIG. 3 shows a test result of a charge-discharge cycle stability of a button battery assembled with the water-based adhesive prepared in Example 2.
Figure 4:
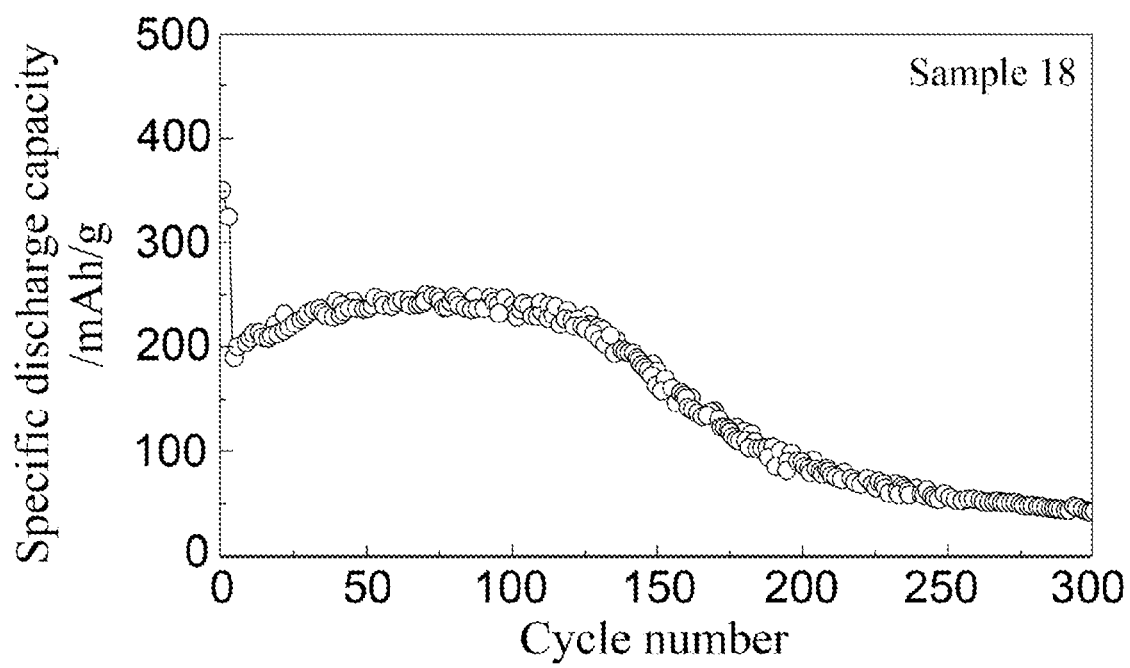
FIG. 4 shows a test result of a charge-discharge cycle stability of a button battery assembled with the water-based adhesive prepared in Comparative Example 1.

As shown in FIG. 1, an initial specific charge-discharge capacity of the button battery from the commercially available water-based adhesive is about 240 mAh/g, and maintains at about 240 mAh/g after a stable cycle, and the specific discharge capacity begins to decay after 200 charge-discharge cycles. As shown in FIG. 2, the initial specific charge-discharge capacity of the button battery from the water-based adhesive prepared in Example 1 is about 220 mAh/g, and maintains at about 300 mAh/g after a stable cycle, and a relatively high specific capacity is maintained after 250 charge-discharge cycles. As shown in FIG. 3, the initial specific charge-discharge capacity of the button battery from the water-based adhesive prepared in Example 2 is about 250 mAh/g, and maintains at about (290-300) mAh/g after a stable cycle, and a relatively high specific capacity is maintained after 400 charge-discharge cycles. The above shows a better stability of the button battery from the water-based adhesive prepared in Examples 1 and 2 than that of the button battery from the commercially available water-based adhesive. As shown in FIG. 4, during preparing the water-based adhesive of Comparative Example 1, no cross-linking agent was added, the initial specific charge-discharge capacity of the button battery from the water-based adhesive prepared in Comparative Example 1 is about 200 mAh/g, and maintains at about 250 mAh/g after a stable cycle, and the specific capacity begins to decay after 150 charge-discharge cycles. This indicates that the cross-linking agent could form a network structure to increase molecular weight and viscosity of the aqueous acrylic resin, thereby improving the adhesive force of the water-based adhesive, and then improving the cycle stability of the battery.

The above descriptions are merely preferred embodiments of the present disclosure. It should be noted that a person of ordinary skill in the art may further make several improvements and modifications without departing from the principle of the present disclosure, and such improvements and modifications should be deemed as falling within the scope of the present disclosure.

What is claimed is:

1. A method for preparing a water-based adhesive, comprising the following steps:
    mixing acrylic acid, acrylonitrile, acrylamide, optionally a surfactant acrylamide and water to obtain a mixture system;
    heating the mixture system to a polymerization temperature to obtain a heated mixture system;
    adding an initiator into the heated mixture system and subjecting a resulting system to polymerization to obtain a linear polymer, wherein the linear polymer consists of units of acrylic acid, acrylonitrile, acrylamide;
    adding a cross-linking agent into the linear polymer and subjecting a resulting mixture to cross-linked reaction to obtain a cross-linking system;
    cooling the cross-linked system after the cross-linking reaction is completed to obtain a cooled cross-linked system; and
    adjusting a pH of the cooled cross-linked system to 6-7 to obtain the water-based adhesive;
        wherein in parts by mass, the surfactant is in an amount of 0 part to 5 parts, the acrylic acid is in an amount of 150 parts to 200 parts, the acrylonitrile is in an amount of 30 parts to 150 parts, the acrylamide is in an amount of 5 parts to 200 parts, and the cross-linking agent is in an amount of 0.05 parts to 5 parts;
        the polymerization is conducted at a temperature of 60° C. to 90° C. for 2 hours to 8 hours; and,
        the cross-linking agent is selected from the group consisting of N,N-methylenebisacrylamide and aziridine, and the cross-linking reaction is conducted at a temperature of 80° C. to 90° C. for 0.5 hours to 3 hours.

2. The method of claim 1, wherein the initiator is one or more selected from the group consisting of ammonium persulfate, sodium persulfate, potassium persulfate, hydrogen peroxide, tert-butyl hydroperoxide, benzoyl peroxide, and 2,2'-azobis[2-(2-imidazolin-2-yl)propane] dihydrochloride.

3. The method of claim 1, wherein the surfactant is selected from the group consisting of an anionic surfactant and a nonionic surfactant.

4. A water-based adhesive prepared by the method of claim 1.

5. The water-based adhesive of claim 4, wherein the initiator is one or more selected from the group consisting of ammonium persulfate, sodium persulfate, potassium persulfate, hydrogen peroxide, tert-butyl hydroperoxide, benzoyl peroxide, and 2,2'-azobis[2-(2-imidazolin-2-yl)propane] dihydrochloride.

6. The water-based adhesive of claim 4, wherein the surfactant is selected from the group consisting of an anionic surfactant and a nonionic surfactant.

* * * * *